Patented Apr. 30, 1929.

1,711,314

UNITED STATES PATENT OFFICE.

WOLFGANG GRUBER, OF BURGHAUSEN, GERMANY, ASSIGNOR TO DR. ALEXANDER WACKER GESELLSCHAFT FUR ELEKTROCHEMISCHE INDUSTRIE, OF MUNICH, GERMANY.

PROCESS FOR THE PRODUCTION OF ACETYL CELLULOSE SOLUBLE IN CHLOROFORM.

No Drawing. Application filed April 24, 1928, Serial No. 272,569, and in Germany May 23, 1927.

This invention relates to a process for producing acetyl cellulose soluble in chloroform and has for its object to greatly decrease the time necessary to produce it without lowering its quality.

The production of acetyl cellulose soluble in chloroform by means of zinc chloride as a catalyzer has long been known, (Franchimont: Berichte. d. Deutsch. Chem. Ges. vol. 12, p. 2059, Knoll D. R. P. 203178). Here the working temperatures are from 70° C. and upward and the time from 12-24 hours.

Also H. Ost (Zeitschrift fur angewandte Chemie 32. Jahrgang 1919 page 66 ff.) determined in experiments with "celluloseacetate soluble in chloroform and aceton" on p. 68, that "the reaction takes place at temperatures from 60-70° C. in 8 hours, but the acetate gives films of low value. The best products are obtained at temperatures from 10-20° C. during a treatment period of several weeks. The extension of the period of treatment by days, or even weeks, does not impair the quality of the product. The zinc chloride operates only to promote the acetylization and with very little disintegrating effect at 10-20° C. At higher temperatures the simultaneous decomposition by acetolysis is considerable.

According to D. R. P. 203178 it is possible to get light and viscous soluble cellulose acetates in 12-24 hrs. at 70° C. but they are still of inferior value because of their bad mechanical properties. On the other hand products of good quality can be obtained using zinc chloride under long treatment periods at low temperature but with inevitable waste of time and expense of production.

In accordance with this invention and contrary to what has previously been known and used, high quality products may be obtained in a very short time by effecting the acetylization of a cellulosic substance in an acetylizing mass containing a catalyzer at an elevated temperature during the first phase of the reaction followed by the continuation of the esterification or reaction for several hours at a lower temperature during the second phase of the reaction. The end of the first phase of the reaction is generally indicated by the destruction of the fibres of the cellulosic material. Cellulose acetates thus produced are highly viscous and mechanically of excellent quality. According to this process, products are obtained in from 3-5 hours without deterioration of the acetylated cellulose, and of the same quality as those formerly produced by several weeks' acetylization at temperatures around 20° C.

The following examples illustrate the process of the invention:—

*Ex. I.*—100 kilos of zinc chloride are dissolved in 300 kilos of acetic acid and 400 kilos of acetic anhydride. Thereupon 100 kilos of cellulose such as cotton paper are added and the mass heated quickly to 55° C. and kept at this temperature until the cotton fibres have lost their structure. This generally occurs within ½ an hour and then the acetylization is continued at a temperature below 40° C. for 3 or 4 hours. By this time the solubility of the acetylization products in tetrachlorethane or chloroform will be found to be complete. After this, the separation and treatment of the acetyl cellulose may be effected in any well known manner.

*Ex. II.*—100 kilos of zinc chloride are dissolved in 400 kilos of acetic acid and 300 kilos of acetic anhydride. Thereupon 100 kilos of cellulose such as cotton waste or linters are added and the mass heated quickly to from 55°-60° C. and kept at this temperature until the disappearance of the fibrous structures. This will take place in about ½ to 2 hours, after which the acetylization is continued at a lower temperature as indicated in Example I for 3-5 hours. At this time the solubility of the acetylization products in chloroform or tetrachlorethane will be found to be complete.

In all cases the cellulose used is prepared for acetylization by the methods of common use. Wood pulp or would pulp paper, or any suitable cellulose containing material can be used instead of cotton, whereby the time necessary for the structural dissolution will depend upon the preliminary treatment and character of the cellulosic substance. If an indifferent solvent such as benzol is added the retention of the original appearance is not a sign of the lack of influence on the cellulose material. The indicated quantitative relations and times are only approximate and can be varied, dependent on the character of the materials used and the reagents employed without departing from the spirit of the invention.

I claim:

1. Process for the production of acetyl cellulose soluble in chloroform, comprising treating cellulose with an acetylizing agent containing zinc chloride at a relatively high temperature until the fibres of the substance have lost their structure and then continuing the treatment at a lower temperature.

2. Process for the production of acetyl cellulose soluble in chloroform comprising treating cellulose with an acetylizing agent containing zinc chloride at a temperature of about 55–60° C. for about half an hour and then continuing the treatment at a temperature below 40° C. for about 3–5 hours.

Signed at Munich, Germany, this 11th day of April A. D. 1928.

Dr. WOLFGANG GRUBER.